June 13, 1967 W. C. MORGAN 3,324,876
MOVABLE IRRIGATION SYSTEMS
Filed Dec. 8, 1964
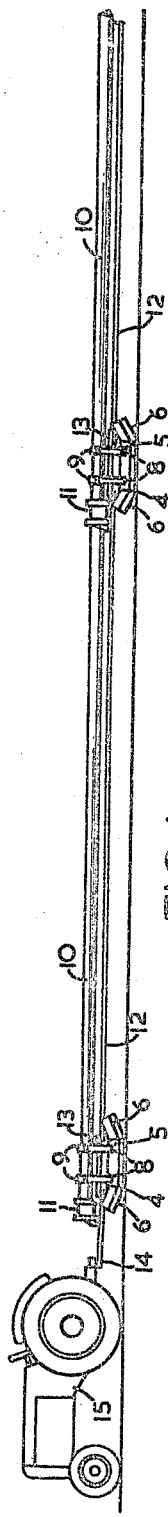
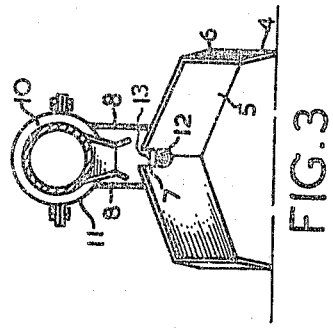
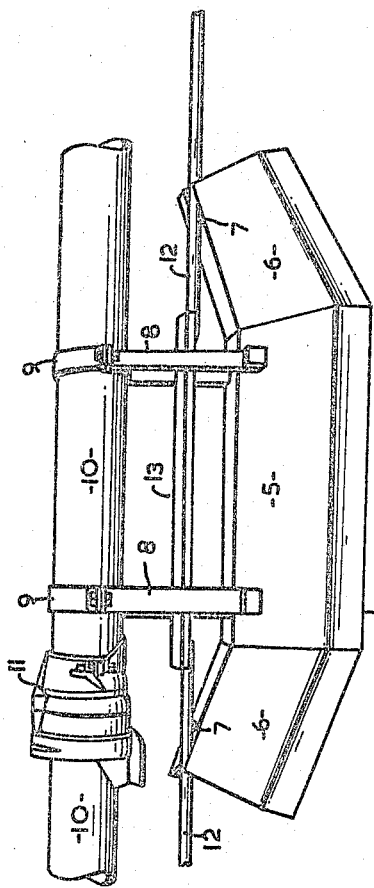

United States Patent Office

3,324,876
Patented June 13, 1967

3,324,876
MOVABLE IRRIGATION SYSTEMS
William Cecil Morgan, 2A Hillview Road, Eastwood, near Sydney, New South Wales, Australia
Filed Dec. 8, 1964, Ser. No. 416,722
2 Claims. (Cl. 137—344)

This invention relates to irrigation systems of the type wherein the pipe lines are mounted on wheels, rollers or skids which can be towed about to position the lines at required locations from time to time.

In the known forms of irrigation systems in common use, the towage of the pipe lines about, imposes strain upon the couplings connecting the pipes together, and on the pipes, with the possibility of damage to both the couplings and to the pipes, and particularly in respect of the joints and sealing means, so that leakages can occur and there is also the possibility of the couplings becoming detached or the pipes therefrom. Also, in such known forms of irrigation systems in common use the towage on cultivated land causes the skids or wheels to dig into the soil and so prevents or impedes the movement of the pipes by mechanical means, and efforts to move such pipes mounted on skids and wheels by said mechanical means often causes damage to the pipes and skids and wheels, and the joints and sealing means.

The present invention has been specially devised to provide means whereby the above stated disabilities are obviated and the towing strain on the pipe lines removed from the couplings and pipes themselves so that such lines can be readily towed about without risk of damage to the pipes, joints and associated parts, and so that the pipe lines may be towed by mechanical means on cultivated soil even though the skids or wheels may have dug into the soil. Also, the angular movement of the pipes on either side of a coupling can be restrained and thereby affording further protection to the couplings. The invention is of a simple nature capable of ready manufacture and application and does not add materially to costs in comparison with the benefits achieved thereby.

According to this invention, a movable irrigation system is characterised in that the pipes of the line or lines of a system are supported upon mounting members employing wheels, rollers, or skid means secured to the respective pipes adjacent a coupling or connection location so that such pipes are individually supported at such locations on such mounting members, and the series of such mounting members in a pipe line system each linked together and connected to a common towage location at one or both ends of the line, the arrangement being such that the towage strain is taken by the linkage through the mounting members from end to end of the connected pipe line.

In some cases the mounting members may have any suitable form of stop means so that the angular or lateral movement at the ends in the linkage of the said members together is controlled and thereby obviating risk of damage to the pipe joints.

The mounting members may be connected together by fixed or pivotal rods, wire ropes, chains or other suitable means adapted to take the load of towing the pipe line and by this means the strain is taken, that is removed from the pipe line and couplings and makes possible the towing of pipe lines in cultivated soil as before referred to.

These mounting members may be fabricated in any suitable manner and have an upper formation or affixing means to fit about the pipe line and include provision for clamping in place such as by split collars or the like fitting about the pipe line and secured in place by bolts through lugs. There maybe a pair of clamps or other affixing means on each mounting member suitably spaced apart and secured to a pipe clear of a coupling.

The lateral movement of the towage connections between the mounting members may be restrained by fixed plates, or other stop devices suitably shaped and arranged on the said members on either side of the connections, or the rod, wire rope, chain or other suitable means may run through the mounting member continuously from end to end of the pipe line.

In the case of the mounting members being in the form of skids, these may be of inverted channel cross section, for example of concave or bowed manner lengthwise thereof and formed of sheet metal of appropriate gauge for the purpose. This shaping forms grooves or channels in the soil and will assist in keeping the pipe line on a desired course.

In order to describe the invention more fully, reference will now be made to the accompanying drawings, wherein:

FIGURE 1 is a side elevation of portion of a movable irrigation pipe line system according to the invention, and connected to a towing tractor, while FIGURE 2 is an enlarged side elevation of a mounting member showing part of an irrigation pipe line carried thereon, and FIGURE 3 is an end elevation of same.

The mounting members generally indicated by the reference 4 are fabricated of sheet metal of inverted channel shaping having a straight medial portion 5 to contact the soil and inclined ends 6 which each have a recess 7 in the upper extremity, and their purpose will be later explained. The medial portion 5 has two pairs of spaced supporting legs 8 affixed at one end thereto and each pair has at its top end a split clamping collar 9.

An irrigation pipe 10 is fitted in and secured by bolts in the clamping collars 9 at a location adjacent a coupling 11 of any suitable form for connecting irrigation pipe lines together, and this method of supporting a pipe 10 takes any strain off the coupling 11.

There may be one mounting member 4 arranged adjacent each coupling 11 of a series of pipes 10 making up an irrigation pipe line system of any desired length.

In the drawings, the mounting members 4 are all connected together by a series of connecting members 12, in this case of rod or bar form extending between the respective mounting members 4 of the system and passing through the end recesses 7 to a location above the related mounting member 4 where the ends are connected together by a link 13 which may be rigidly affixed to said members 12 in any suitable known manner, and also to the said members.

In some cases the connection of the link 13 to the ends of the connecting members 12 may be effected in pivotal manner to allow of a limited lateral movement of the said members 12 in relation to the mounting members 4 in towage and the movement limited by the width and form of the recesses. The lateral movement must not exceed the extent of adjusting movement of the couplings.

These connecting members 12 extend between all the mounting members 4 throughout the length of a pipe line system so that the towage strain is taken by such members 12 throughout the length of the system, and any suitable form of towage hitch or connection is provided at 14 at one or both ends of the connection assembly for coupling to a towing tractor 15 as seen in FIGURE 1, and by means of which the pipe line system can be moved from one position to another in a quick manner, and the strain of the load in such towage about is removed from the pipe couplings.

The shaping of these particular mounting members 4 as illustrated in the drawings is such as to form grooved mounds in the cultivated soil which assists in keeping the pipe line system on a desired course.

It is to be understood that while form of mounting member 4 employing skid-like formations has been described and illustrated herein the invention is not limited to this precise form as such members may be made in other ways and employ wheels or rollers and the pipes may be clamped in place to such members in any other suitable manner.

I claim:

1. A mounting and haulage device for a movable irrigation pipe-line of the kind consisting of a train of pipe lengths loosely but liquid-tightly coupled together in end-to-end axial alignment, comprising:
   (a) for each of said pipe lengths, a skid runner of inverted channel cross-sectional shape and consisting of an earth-troweling and track-riding roof-plate having each of its end portions uptilted, and a pair of spaced-apart generally parallel track-cutting plates which extend generally vertically downwardly from said roof-plate on either side thereof,
   (b) pedestals mounted on each of said skid runners as sole supports for said train of pipe lengths, which include clamps adapted to hold a pipe length elevated clear of and above the related skid runner with the longitudinal axis of said pipe length parallel to that of the related skid runner,
   (c) a tension tie-rod which extends longitudinally of said train (of pipe lengths), and
   (d) means for attaching said tension tie-rod to each of the skid runners in said train of pipe lengths.

2. A device according to claim 1, wherein said tension tie-rod comprises a plurality of serially connected rod sections and links, each of said skid runners being provided with a link, said link being rigidly secured to the pedestals of its respective skid runner, and means pivotally connecting the ends of the rod sections to the ends of the links which they confront.

References Cited

UNITED STATES PATENTS

| Re. 24,041 | 7/1955 | Hondeville | 239—213 |
| 1,601,199 | 9/1926 | Clapper | 239—213 |
| 2,741,509 | 4/1956 | Melcher | 137—344 |
| 2,796,292 | 6/1957 | Maggart | 239—213 |
| 2,834,634 | 5/1958 | Johnson | 239—213 X |
| 2,889,993 | 6/1959 | Willetts et al. | 239—213 X |
| 3,057,559 | 10/1962 | Ingram et al. | 239—213 |

M. CARY NELSON, *Primary Examiner.*

S. SCOTT, *Assistant Examiner.*